United States Patent
Kwon (10) Patent No.: US 8,000,559 B2
(45) Date of Patent: Aug. 16, 2011

(54) METHOD OF CORRECTING IMAGE DISTORTION AND APPARATUS FOR PROCESSING IMAGE USING THE METHOD

(75) Inventor: Sung Jin Kwon, Yeoju-gun (KR)

(73) Assignee: Core Logic, Inc., Seoul (KR)

( * ) Notice: Subject to any disclaimer, the term of this patent is extended or adjusted under 35 U.S.C. 154(b) by 526 days.

(21) Appl. No.: 12/199,191

(22) Filed: Aug. 27, 2008

(65) Prior Publication Data

US 2009/0059041 A1 Mar. 5, 2009

(30) Foreign Application Priority Data

Aug. 27, 2007 (KR) .................. 10-2007-0086274

(51) Int. Cl.
- *G06K 9/36* (2006.01)
- *G06K 9/40* (2006.01)
- *H04N 5/228* (2006.01)
- *G02B 13/16* (2006.01)
- *H04N 5/225* (2006.01)

(52) U.S. Cl. ............... 382/276; 348/222.1; 348/335; 382/254; 382/266

(58) Field of Classification Search ............... 348/222.1, 348/241; 382/276
See application file for complete search history.

(56) References Cited

U.S. PATENT DOCUMENTS

| | | | | |
|---|---|---|---|---|
| 5,901,252 A * | 5/1999 | Kawakami et al. | ............ | 382/276 |
| 5,999,660 A * | 12/1999 | Zorin et al. | .................. | 382/276 |
| 6,671,400 B1 * | 12/2003 | Ekpar et al. | .................. | 382/157 |
| 7,099,521 B2 * | 8/2006 | Liu et al. | ..................... | 382/276 |
| 7,113,650 B2 * | 9/2006 | Liu et al. | ....................... | 382/276 |
| 7,505,633 B2 * | 3/2009 | Kitajima | ..................... | 382/276 |
| 7,619,663 B2 * | 11/2009 | Sakurai et al. | ................ | 348/241 |
| 2004/0001146 A1 * | 1/2004 | Liu et al. | .................. | 348/207.99 |
| 2004/0076340 A1 * | 4/2004 | Nielsen | .......................... | 382/284 |

(Continued)

FOREIGN PATENT DOCUMENTS

JP 2004-199350 7/2004

(Continued)

OTHER PUBLICATIONS

Korean Intellectual Property Office, Non-Final Office Action for Korean Patent Appl. No. 1020070086274 mailed Aug. 26, 2010 corresponding to U.S. Appl. No. 12/199,191.

(Continued)

*Primary Examiner* — Lin Ye
*Assistant Examiner* — Chia-Wei A Chen
(74) *Attorney, Agent, or Firm* — Edwards Angell Palmer & Dodge LLP; Kongsik Kim (57) ABSTRACT

A method of correcting image distortion and an apparatus for processing an image using the method are provided, where the method can overcome the disadvantages of the conventional methods of correcting lens distortion and can minimize image quality degradation at outer portions,. The method includes: receiving an image from a wide-angle lens; extracting a distortion coefficient of the distortion in the image caused by the wide-angle lens; correcting the distortion of the image by using the extracted distortion coefficient; and displaying a corrected image. The apparatus includes: a wide-angle lens for receiving an image; an image processing unit comprising a distortion coefficient extracting unit for extracting a distortion coefficient of distortion in the image caused by the wide-angle lens and a distortion correcting unit for correcting the distortion of the image using the extracted distortion coefficient; and a display unit for displaying a corrected image.

14 Claims, 8 Drawing Sheets

U.S. PATENT DOCUMENTS

| | | | |
|---|---|---|---|
| 2005/0058360 A1* | 3/2005 | Berkey et al. | 382/254 |
| 2006/0244822 A1* | 11/2006 | Konno et al. | 348/77 |
| 2007/0036460 A1* | 2/2007 | Koch | 382/276 |
| 2007/0211955 A1* | 9/2007 | Pan et al. | 382/254 |
| 2008/0002041 A1* | 1/2008 | Chuang et al. | 348/241 |
| 2008/0063292 A1* | 3/2008 | Nose et al. | 382/243 |
| 2008/0144968 A1* | 6/2008 | Cohen et al. | 382/276 |
| 2009/0041379 A1* | 2/2009 | Shih | 382/276 |

FOREIGN PATENT DOCUMENTS

KR   100744937   7/2007

OTHER PUBLICATIONS

Chinese Patent Office, English Translation of First Office Action for Chinese Patent Appl. No. 2008101887708 dated May 12, 2010 corresponding to U.S. Appl. No. 12/199,191.

* cited by examiner

METHOD OF CORRECTING IMAGE DISTORTION AND APPARATUS FOR PROCESSING IMAGE USING THE METHOD

CROSS-REFERENCE TO RELATED PATENT APPLICATION

This application claims the benefit of Korean Patent Application No. 10-2007-0086274, filed on Aug. 27, 2007, in the Korean Intellectual Property Office, the disclosure of which is incorporated herein in its entirety by reference.

FIELD OF THE INVENTION

The present invention relates to a method and apparatus for processing an image, and particularly, to a method of correcting image distortion and an apparatus for processing an image using the method.

BACKGROUND OF THE INVENTION

Cameras have been used in a wide range of industrial applications and are being used in an increasingly larger number of applications. For example, cameras are used in place of human eyes in many automatic industrial applications, including monitoring of robots on an assembly line, product quality testing, medical diagnosis, security, and recognition of an image captured by an imaging system.

In general, when a high resolution image needs to be obtained, a narrow-angle lens is placed in front of a camera, and when a wider area needs to be photographed, a wide-angle lens is placed in front of the camera. A wide-angle lens allows a wide angle of view, but has a disadvantage in that resolution decreases from the center to outer portions of the lens.

The wide-angle lens also has a disadvantage in that radial distortion increases from the center to the outer portions of the lens. Such radial distortion is a main cause of resolution degradation.

Figure 1A:
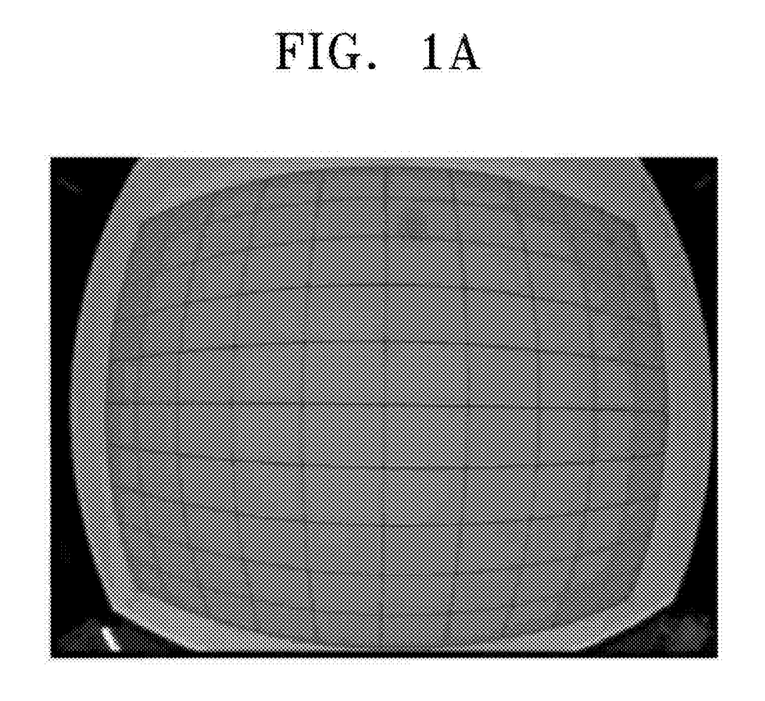
FIGS. 1A and 1B illustrate a pattern image and a web image respectively in which radial distortion is caused by a wide-angle lens.
Figure 1B:
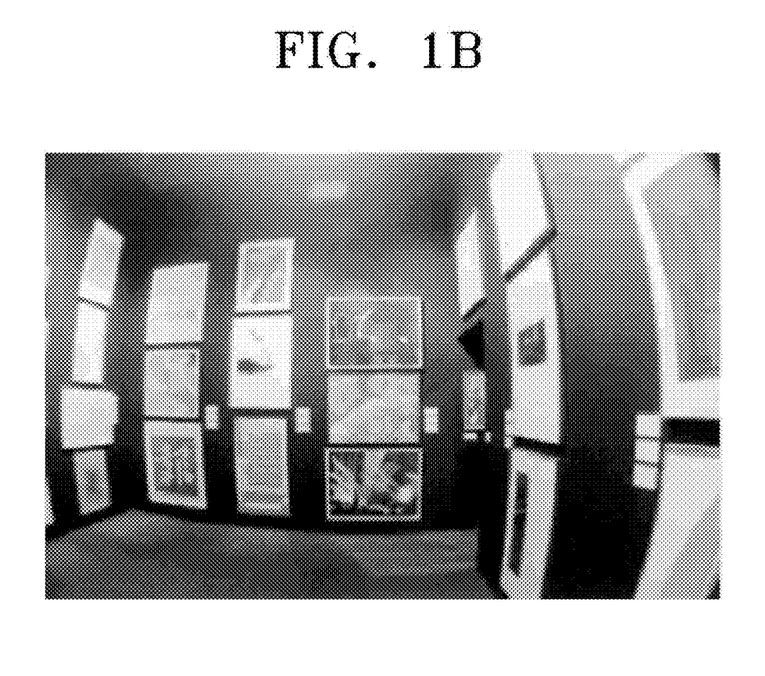

FIGS. 1A and 1B illustrate a pattern image and a web image in which radial distortion is caused by a wide-angle lens, respectively. As described above, resolution decreases and radial distortion increases from the center to outer portions of the lens.

A known method of correcting lens distortion is divided into a metric method and a non-metric method. The metric method corrects a distortion in an image using the intrinsic and extrinsic parameters of a camera model that may affect the lens distortion. The intrinsic and extrinsic parameters are measured on the basis of reference points. The non-metric method does not rely on reference points but relies on the fact that straight lines in a scene must always project to straight lines in an image. The non-metric method corrects distortion by fitting curved lines caused by lens distortion into straight lines.

In the metric method, using more reference points may increase the accuracy of distortion coefficients. Thus, the metric method may require a plurality of pattern images in extracting the reference points. In addition, the metric method may introduce severe measurement errors that occur when the intrinsic and extrinsic parameters are obtained.

In the non-metric method, the distortion coefficients can be obtained by using a single image without the use of any reference points. However, in the non-metric method, the distortion coefficients can be measured only when the image contains an object having linear components. In addition, automatic distortion correcting algorithms are very sensitive to noise in the non-metric method.

SUMMARY OF THE INVENTION

The present invention provides an apparatus and a method of correcting image distortion that can overcome the disadvantages of conventional methods of correcting lens distortion and can reduce image quality degradation at outer portions of an image.

According to an aspect of the present invention, a method of correcting image distortion is provided and includes: receiving an image from a wide-angle lens; extracting a distortion coefficient of the distortion in the image; correcting the distortion of the image using the extracted distortion coefficient; and displaying a corrected image.

Extracting the distortion coefficient may comprise manually obtaining an optimal distortion coefficient within a predefined range by using a lens distortion model. Correcting the distortion of the image may comprise applying backward mapping using the extracted distortion coefficient. The lens distortion model may be described with the equation $$R_C = R_D(1 + kR^2_D),\ 0 < k \leq (a-1)/R^2_{DM}$$

where: $R_C$ is a distance from a predetermined point to the origin of a coordinate system of the corrected image; $R_D$ is a distance from the predetermined point to the origin of a coordinate system of the image with the distortion; and k is a distortion coefficient that is greater than 0 and equal to or less than (a−1) divided by the square of $R_{DM}$. The term, $R_{DM}$, is a maximum distance from the origin of the coordinate system of the image with the distortion to an outermost point, and a is a constant greater than 2.

Correcting the distortion of the image may comprise removing jagged-edge artifacts by using bilinear interpolation. The correcting of the distortion of the image may also comprise fitting a curve at outer portions in order to minimize blurring at outer portions of the corrected image.

The fitting of the curve at the outer portions may comprise selecting a plurality of points based on an inflection point in an $R_C$-$R_D$ graph and fitting the curve based on the selected plurality of points.

According to another aspect of the present invention, apparatus for processing an image is provided and includes: a wide-angle lens for receiving an image; an image processing unit comprising a distortion coefficient extracting unit for extracting a distortion coefficient of distortion in the image caused by the wide-angle lens, a distortion correcting unit for correcting the distortion of the image by using the extracted distortion coefficient; and a display unit for displaying the corrected image.

The wide-angle lens may comprise a fish-eye lens having a viewing angle of less than 120°. The distortion coefficient extracting unit may manually obtain an optimal distortion coefficient within a predefined range by using a lens distortion model.

The distortion correcting unit may correct radial distortion that is caused by the wide-angle lens through backward mapping using the distortion coefficient. The distortion correcting unit may remove jagged-edge artifacts caused by the correcting of the radial distortion by using a bilinear interpolation.

The image processing unit may further comprise a curve fitting unit for fitting a curve at the outer portions in order to minimize the blurring at the outer portions of the corrected image. The curve fitting unit may select a plurality of points based on an inflection point in an $R_C$-$R_D$ graph and fit the curve at the outer portions using a cubic equation.

BRIEF DESCRIPTION OF THE DRAWINGS

The features and advantages of the present invention will become more apparent upon consideration of the detailed description taken in conjuction with the accompanying drawings, in which like reference characters refer to like parts throughout, and in which.

DETAILED DESCRIPTION OF THE INVENTION

It should be understood that when an element is described as being connected to another element, the elements may be directly connected, or an intervening element may exist between the two elements. In the following description of the present invention, the sizes of elements shown in the drawings may be exaggerated, if needed, or an element may be omitted from the drawing for a better understanding of the present invention. Like reference number refer to like element throughout the drawings. Terms used are intended to depict the exemplary embodiments and should not be interpreted as limiting the intended scope of the claims.

Figure 2A:
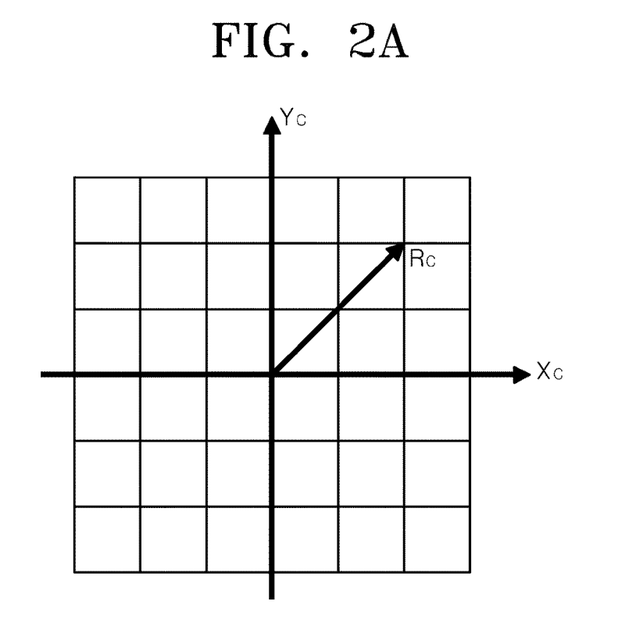
FIGS. 2A and 2B are plane coordinate systems for explaining radial distortion caused by a wide-angle lens.
Figure 2B:
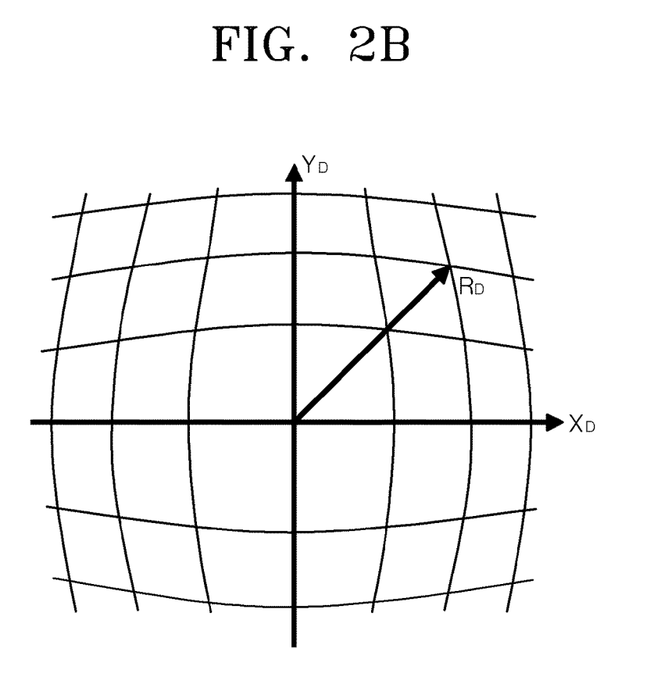

FIGS. 2A and 2B are the plane coordinate systems showing the radial distortion caused by a wide-angle lens. FIG. 2A illustrates a coordinate system of a corrected image. FIG. 2B illustrates a coordinate system of an image with radial distortion that is caused by a wide-angle lens. The radial distortion caused by a wide-angle lens increases farther away from the origin, such that the size of a subject increases and the degree of a curve increases farther away from the origin. In FIGS. 2A and 2B, $R_C$ is a distance from a predetermined point to the origin of the coordinate system of the corrected image, and $R_D$ is a distance from the predetermined point to the origin of the coordinate system of the image with the radial distortion.

Figure 3:
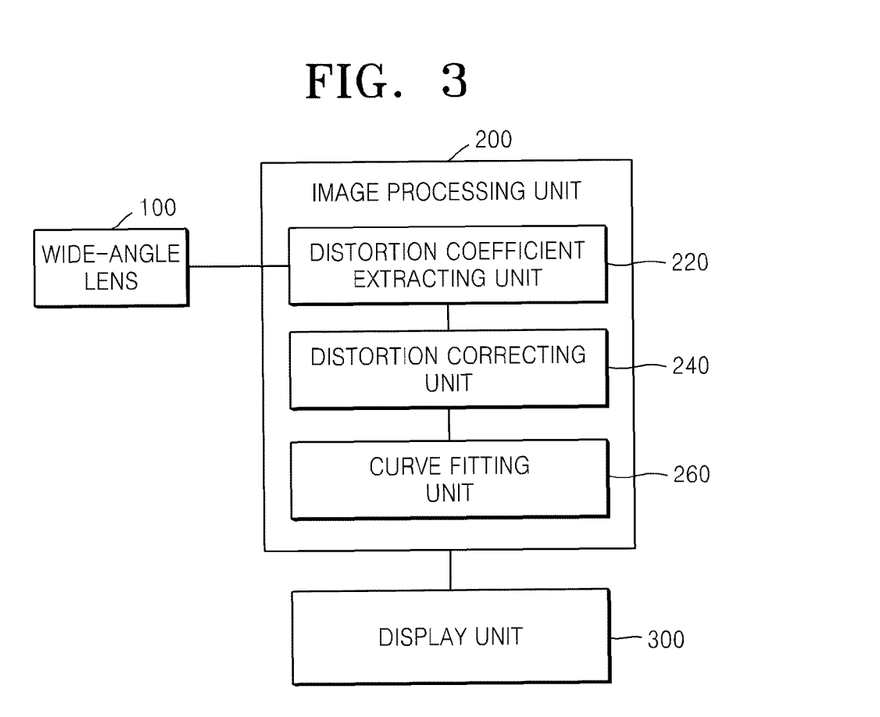
FIG. 3 is a block diagram of an apparatus for processing an image using a method of correcting image distortion according to an embodiment of the present invention.

FIG. 3 is a block diagram of an apparatus for processing an image using a method of correcting image distortion according to an embodiment of the present invention. The apparatus includes a wide-angle lens 100, an image processing unit 200, and a display unit 300. The wide-angle lens 100 may be a fish-eye lens having a viewing angle of less than 120°, and more precisely, a viewing angle of 60 to 120°. The display unit 300, which displays an image processed by the image processing unit 200, may be a liquid crystal display (LCD) monitor or a cathode ray tube (CRT) monitor.

The image processing unit 200 processes an image received through the wide-angle lens 100, and includes a distortion coefficient extracting unit 220, a distortion correcting unit 240, and a curve fitting unit 260 in order to correct the radial distortion caused by the wide-angle lens 100. The image received through the wide-angle lens 100 is captured by an image sensor as an electrical signal image. The image processing unit 200 corrects the electrical signal image. Although not shown, the image processing unit 200 may include a multimedia processor, which converts the corrected electrical signal image into an image file, and a memory, which stores the image file.

The distortion coefficient extracting unit 220 extracts a distortion coefficient of the distortion caused in the image by the wide-angle lens 100. The distortion correcting unit 240 corrects the image through backward mapping by using the extracted distortion coefficient.

Specifically, in order to correct the radial distortion created in the image, a distortion coefficient is extracted by using a warping equation or a lens distortion model, and the distortion is corrected by image warping by using the extracted distortion coefficient. Image warping is divided into forward mapping and backward mapping. Forward mapping has an advantage in that the pixels of a corrected image, which correspond to pixels of a distorted image, can be directly calculated from the distorted image, but has a disadvantage in that some holes may be generated in the corrected image because integer calculations are performed to calculate the pixels of the corrected image.

Unlike the forward mapping, the backward mapping does not generate the holes since coordinates of a distorted image are calculated by using coordinates of a corrected image.

The distortion coefficient extracting unit 220 uses Equation 1 below as a lens distortion model to obtain a distortion coefficient.

$$R_C = R_D(1 + kR^2_D), \quad 0 < k \leq (a-1)/R^2_{DM} \qquad (1)$$

where $R_C$ is a distance from a predetermined point to the origin of a coordinate system of a corrected image, $R_D$ is a distance from the predetermined point to the origin of a coordinate system of a distorted image, $R_{DM}$ is a maximum distance from the origin of the coordinate system of the distorted image to an outermost point, k is a distortion coefficient, and a is a constant greater than 2.

According to the lens distortion model, an optimal distortion coefficient k is manually measured within a predefined measurement range, without using auto-estimation, in order to remove an error caused by noise that a conventional method encounters. That is, an optimal distortion coefficient within a predefined range, which allows an image received through the wide-angle lens 100 to be the same as an image perceived by human eyes, is obtained manually.

For increased precision, the lens distortion model may use higher order terms including a plurality of distortion coefficients. However, increasing the number of distortion coefficients may increase the errors introduced during the distortion coefficient measurement, thus increasing subsequent numerical calculation errors. Accordingly, the apparatus of FIG. 3 uses only one distortion coefficient because the radial distortion can be sufficiently modeled with only one distortion coefficient. As shown in Equation 1, the lens distortion model used by the apparatus of FIG. 3 includes only one distortion coefficient.

Since the present invention assumes that distortion is radial distortion, an optimal distortion coefficient is a positive number and a maximum value is determined by the distance $R_{DM}$ and the constant a. Accordingly, the optimal distortion coefficient may be manually extracted according to Equation 1 within a predefined range.

Once the optimal distortion coefficient is extracted by the distortion coefficient extracting unit 220, the distortion correcting unit 240 corrects the image through backward mapping by using the extracted distortion coefficient. Although backward mapping can overcome the disadvantage of forward mapping, i.e., removing some holes in the corrected image, the backward mapping may leave a defect, i.e., jagged-edge artifacts in linear components of the image. Accordingly, the distortion correcting unit 240 of FIG. 3 performs bilinear interpolation, which uses a weighted sum of four nearest neighboring pixels, in order to remove the jagged-edge artifacts.

The curve fitting unit 260 reduces image quality degradation at the outer portions of the image corrected by the distortion correcting unit 240. The image corrected by the distortion correcting unit 240 is greater in size than the distorted image, that is, the original image, because the size of the corrected image increases with an increase in a viewing angle. Also, since a radial distortion generally increases from the origin to outer portions of an image, image quality degradation, e.g., blurring, at the outer portions of the image is noticeable. Accordingly, the curve fitting unit 260 reduces such image quality degradation by using a radial distortion curve based on the relation between $R_C$ and $R_D$ according to Equation 1. The use of the radial distortion curve will be explained in detail with reference to FIG. 4.

Figure 4:
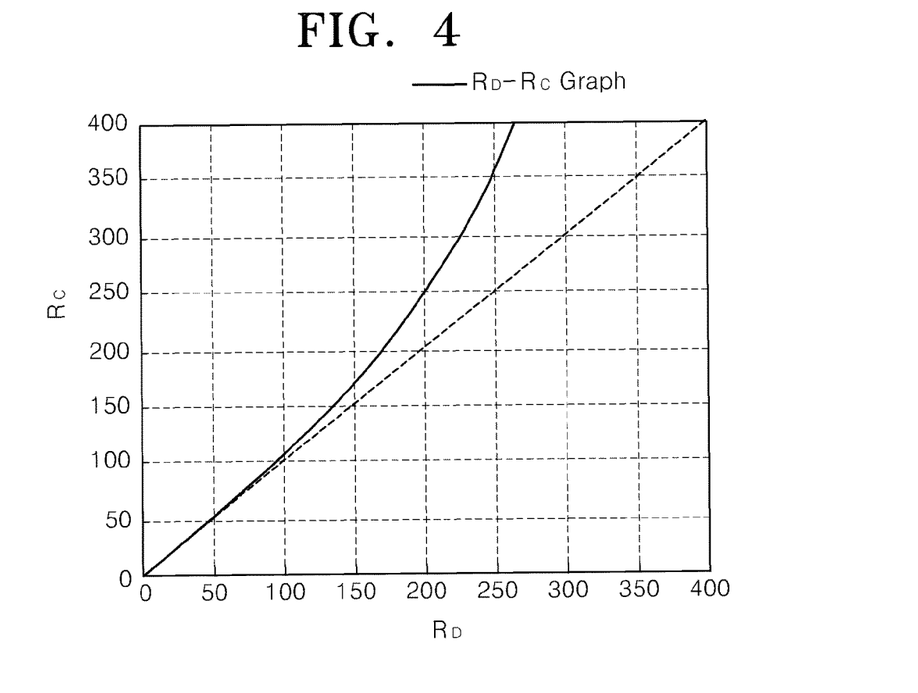
FIG. 4 is a graph of a radial distortion curve that is used to correct a distorted image.

FIG. 4 is a graph of a radial distortion curve illustrating the relation between the $R_C$ and $R_D$. The radial distortion curve is used to correct the distorted image. A solid line, which is a radial distortion curve according to Equation 1, steepens as a distance $R_C$ from a predetermined point to the origin of a coordinate system of a corrected image increases. A dotted line, which is a line for the best corrected image or a real image, shows that distances $R_C$ and $R_D$ are directly proportional to each other. Thus, the image quality degradation at outer portions of the corrected image is unavoidable if a distorted image is corrected using the radial distortion curve shown.

Figure 5:
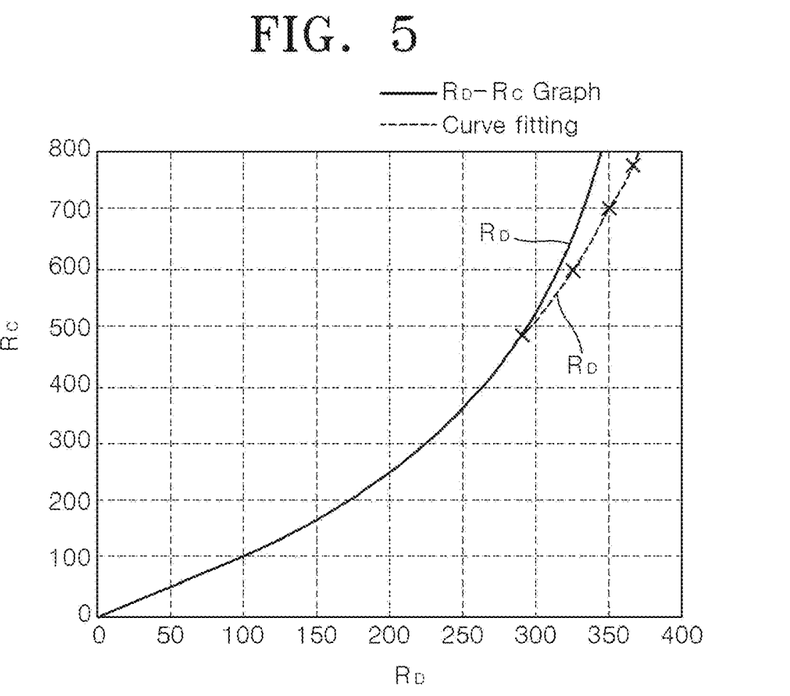
FIG. 5 is a graph illustrating a method of fitting the radial distortion curve of FIG. 4.

FIG. 5 is a graph for explaining a method of fitting the radial distortion curve of FIG. 4. The outer portions of the radial distortion curve are fitted in order to reduce the image quality degradation at the outer portions. In FIG. 5, the solid line is the original radial distortion curve, and the dotted line is a fitted radial distortion curve. The radial distortion curve may be fitted by selecting a plurality of points based on an inflection point of the original radial distortion curve, and then fitting the radial distortion curve from the inflection point by using an appropriate cubic equation.

Figure 6A:
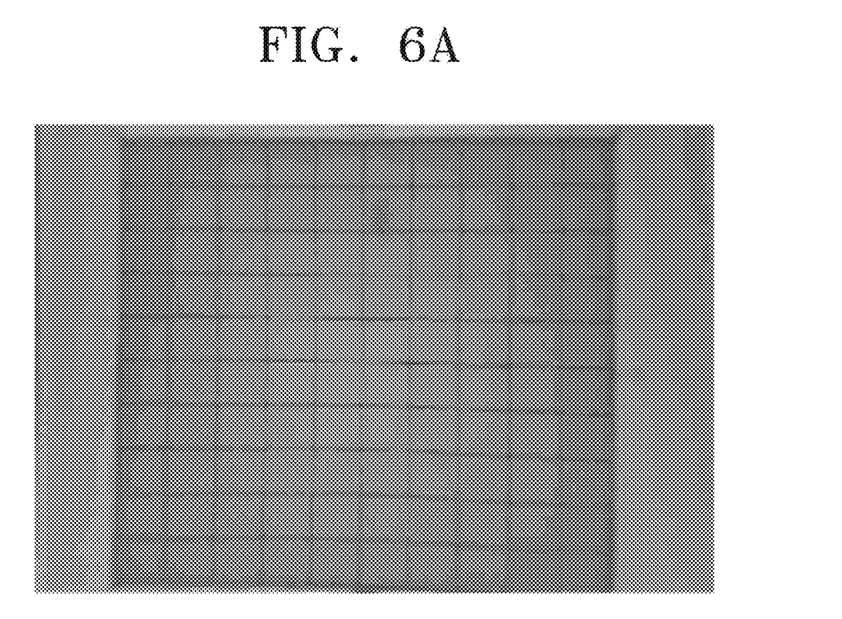
FIGS. 6A and 6B illustrate the pattern image and the web image illustrated in FIGS. 1A and 1B after the distortion has been corrected using the apparatus shown in FIG. 3.
Figure 6B:
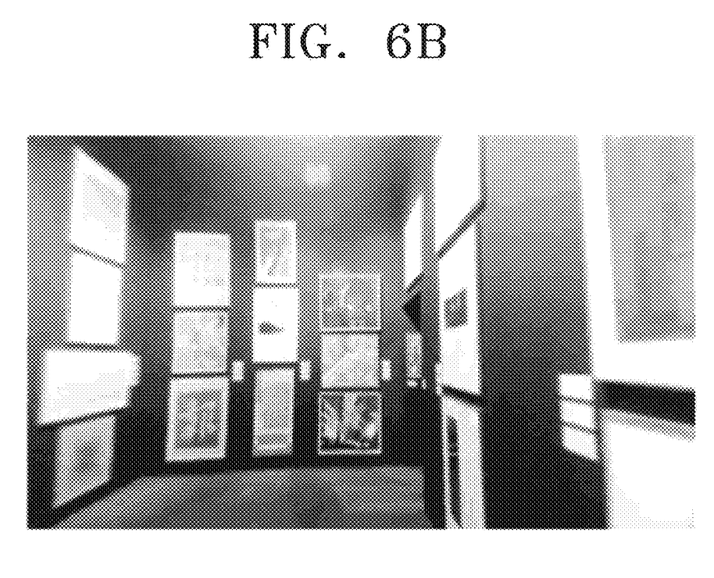

FIGS. 6A and 6B illustrate a pattern image and a web image, corresponding to those illustrated in FIGS. 1A and 1B, for which distortion is corrected by using the apparatus of FIG. 3.

The apparatus of FIG. 3 can correct the pattern image and the web image of FIGS. 1A and 1B, in which radial distortion is caused by a wide-angle lens, to the pattern image and the web image with distortions removed as shown in FIGS. 6A and 6B.

Figure 7:
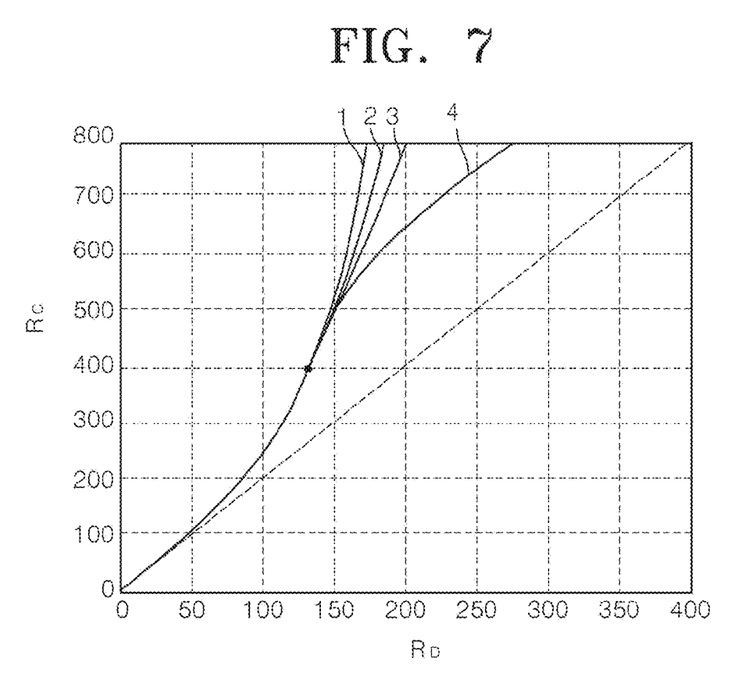
FIG. 7 is a graph illustrating the method of FIG. 5 in further detail.

FIG. 7 is a graph illustrating the method of FIG. 5 using multiple radial distortion curves. A radial distortion curve with a better fit than that of FIG. 5 may be produced by changing the cubic equation. The dot on the solid line is the selected inflection point. A line 1 is an original radial distortion curve, and lines 2 through 4 are radial distortion curves fitted by using Cubic Equations 2, 3, and 4, respectively.

$$R_D = (1.0 \times 10^{-9}) \times R^3_C - 0.000248 \times R^2_C + 0.555 \times R_C + 79 \quad (2)$$

$$R_D = (-1.0 \times 10^{-20}) \times R^3_C - (7.8 \times 10^{-35}) \times R^2_C + 0.43 \times R_C + 105 \quad (3)$$

$$R_D = (-1.37 \times 10^{-6}) \times R^3_C + 0.00367 \times R^2_C - 2.16 \times R_C + 634 \quad (4)$$

Figure 8A:
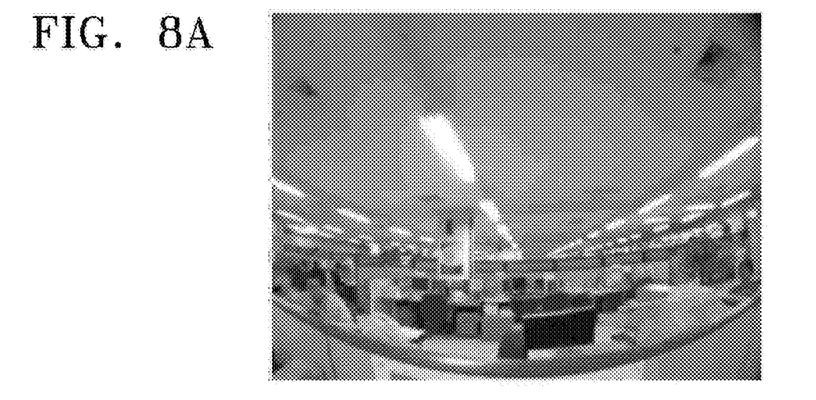
FIGS. 8A through 8E illustrate a distorted image and corrected images obtained by the method of fitting the distortion curves shown in FIG. 7.
Figure 8B:
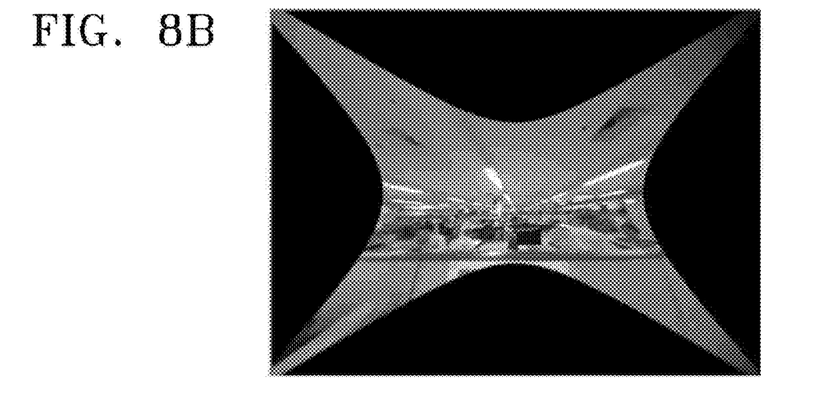
Figure 8C:
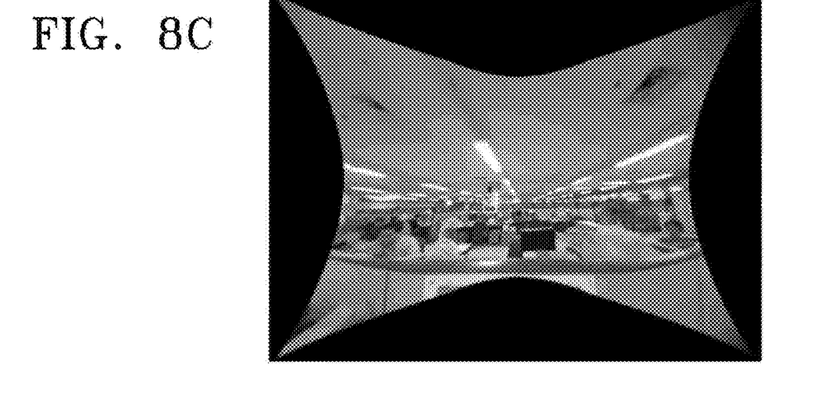
Figure 8D:
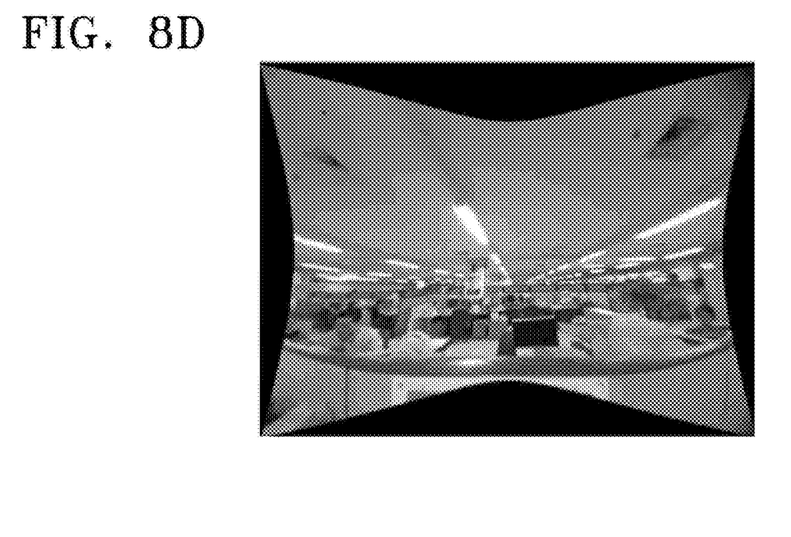
Figure 8E:
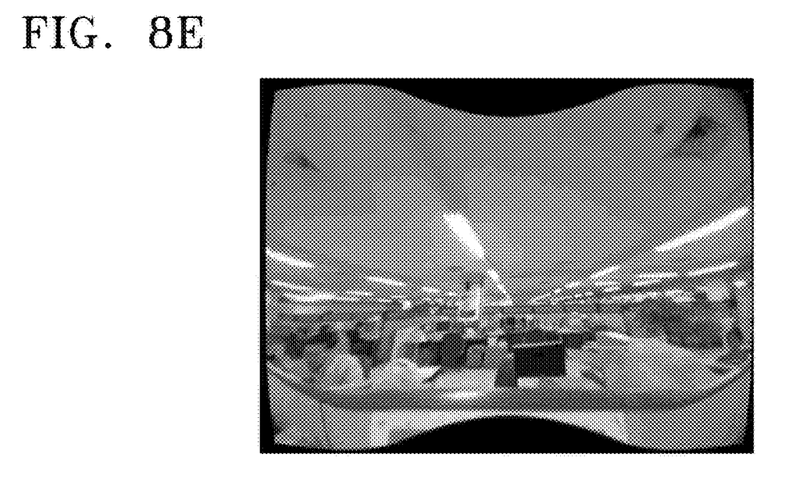

FIGS. 8A through 8E illustrate a distorted image and the images corrected by the method using the equations of FIG. 7. FIG. 8A shows a web image in which distortion is caused by a wide-angle lens. FIG. 8B shows a web image corrected by using the original radial distortion curve 1 of FIG. 7. FIG. 8C shows a web image corrected by using the fitted radial distortion curve 2 of FIG. 7. FIG. 8D shows a web image corrected by using the fitted radial distortion curve 3 of FIG. 7, and FIG. 8E shows a web image corrected by using the fitted radial distortion curve 4 of FIG. 7.

The image quality at the outer portions of the image are improved by the method of FIG. 7. Comparing the corrected figures, the quality of the web image of FIG. 8C is better than that of the web image of FIG. 8B. Although the quality of the web image of FIG. 8D is better than that of the web image of FIG. 8C, some distortion occurs again in the web image of FIG. 8D.

Accordingly, the apparatus of FIG. 3 corrects an image to an optimal image that is almost the same as an image perceived by the human eye. The apparatus removes the blurring at outer portions by selecting an appropriate cubic equation and fitting a radial distortion curve according to the cubic equation.

Figure 9:
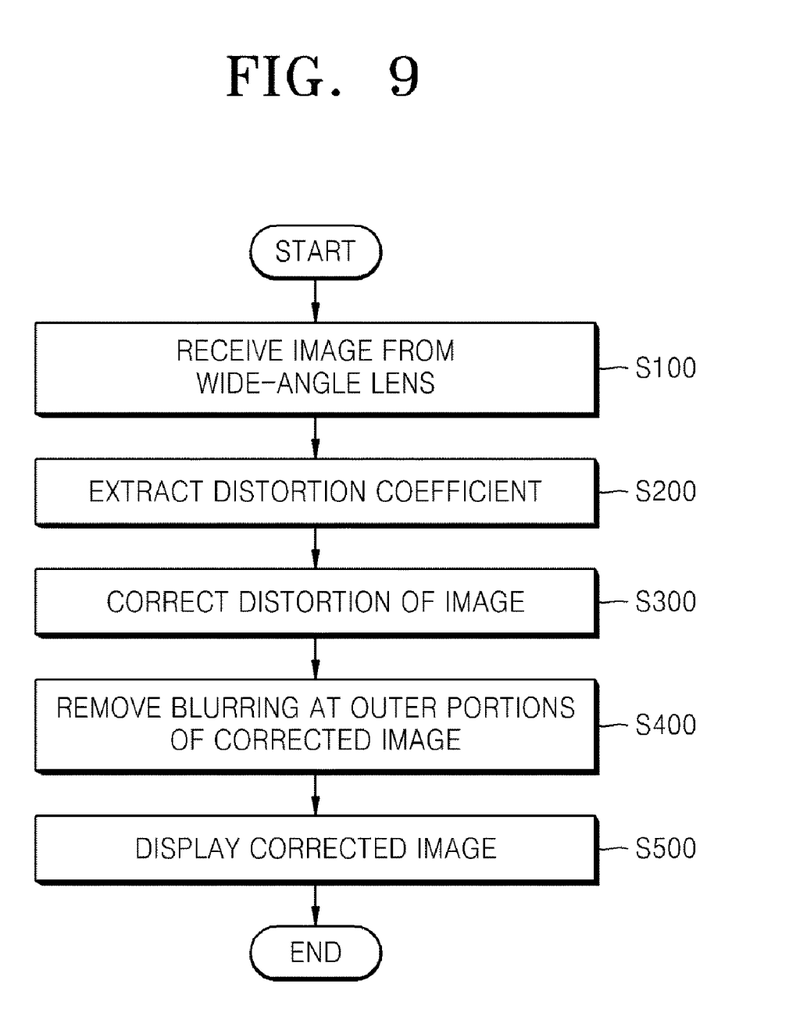
FIG. 9 is a flowchart illustrating a method of correcting image distortion according to another embodiment of the present invention.

FIG. 9 is a flowchart illustrating a method of correcting image distortion according to another embodiment of the present invention. In operation S100, an image is received from a wide-angle lens. As described above, when the image is received from the wide-angle lens, image distortion, for example, radial distortion, is caused by the wide-angle lens. In operation S200, a distortion coefficient is extracted in order to correct the radial distortion of the image. An optimal distortion coefficient that allows the image received through the wide-angle lens to be almost the same as that perceived by human eyes may be manually extracted by using an appropriate distortion coefficient model where the distortion coefficient falls within a predefined range. Equation 1 is an example of a distortion coefficient model.

In operation S300, the distortion of the image is corrected by backward mapping. Jagged-edge artifacts caused by the backward mapping are removed by bilinear interpolation.

In operation S400, the blurring at outer portions of the corrected image is removed. The blurring may be removed by curve fitting such as, for example, by selecting a plurality of points based on an inflection point and fitting a curve by using an appropriate cubic equation.

In operation S500, the corrected image is converted into an image file by a multimedia processor and displayed on a display unit.

An image with a distortion caused by a wide-angle lens is corrected to an optimal image that is almost the same as that perceived by human eyes using the method of correcting the distortion in FIG. 9 that manually extracts an optimal distortion coefficient within a predetermined range, performs backward mapping by using the extracted optimal distortion coefficient, removes jagged-edge artifacts by using bilinear interpolation, and removes blurring at outer portions by using curve fitting.

As described above, the method of correcting the image distortion and the apparatus for performing the method according to the present invention do not require a single pattern image or a plurality of pattern images in order to correct distortion that is caused by a wide-angle lens. That is, since a distortion coefficient is manually extracted, the method and apparatus according to the present invention do not need any pattern image for extracting corresponding points, unlike a conventional method and apparatus.

Furthermore, since the method according to the present invention removes jagged-edge artifacts by using bilinear interpolation and removes blurring at output portions by using curve fitting, the method can correct an image to an optimal image that is almost the same as that perceived by human eyes.

Furthermore, the apparatus using the method according to the present invention properly corrects distortion caused by a fish-eye lens or a lens having a viewing angle of 120° to an image that is almost the same as that perceived by human eyes.

While the present invention has been particularly shown and described with reference to exemplary embodiments thereof, one of ordinary skill in the art will understand that various changes in the form and the details may be made therein without departing from the spirit and scope of the present invention as defined by the following claims.

What is claimed is:

1. A method of correcting image distortion, the method comprising:
   receiving an image with a distortion from a wide-angle lens;
   extracting a distortion coefficient for the image with the distortion caused by the wide-angle lens;
   correcting the distortion of the image using the extracted distortion coefficient;
   wherein the step of correcting the distortion comprises fitting a curve at outer portions of the corrected image in order to reduce blurring at outer portions of the corrected image;
   wherein the step of fitting the curve comprises selecting a plurality of points based on an inflection point in an $R_C$-$R_D$ graph and fitting the curve using the selected plurality of points;
   wherein $R_C$ is a distance from a predetermined point to an origin of a coordinate system of the corrected image, and $R_D$ is a distance from a predetermined point to the origin of a coordinate system of the image with the distortion, and
   displaying the corrected image.

2. The method of claim 1, wherein the wide-angle lens comprises a fish-eye lens having a viewing angle of less than 120°.

3. The method of claim 1, wherein the step of extracting the distortion coefficient comprises manually obtaining the distortion coefficient within a predefined range using a lens distortion model.

4. The method of claim 3, wherein the step of correcting the distortion comprises correcting the distortion of the image through backward mapping using the extracted distortion coefficient.

5. The method of claim 3, wherein the lens distortion model is given as follows: $R_C$, a distance from a predetermined point to an origin of a coordinate system of the corrected image, is equal to $R_D$, a distance from a predetermined point to an origin of a coordinate system of the image with the distortion, plus the cube of $R_D$;
   wherein a coefficient of the cube of $R_D$ is a distortion coefficient k, and the distortion coefficient k is greater than 0 and is equal to or less than (a−1) divided by $R_{DM}$, and
   wherein $R_{DM}$ is a maximum distance from the origin of the coordinate system of the image with the distortion to an outermost point of the image with the distortion, and a is a constant greater than 2.

6. The method of claim 5, wherein the step of correcting the distortion comprises correcting a radial distortion using the extracted distortion coefficient.

7. The method of claim 6, wherein the step of correcting the distortion comprises removing jagged-edge artifacts using bilinear interpolation.

8. The method of claim 1, wherein the fitting the curve at the outer portions is performed using a cubic equation.

9. An apparatus for processing an image, the apparatus comprising:
   a wide-angle lens for receiving an image;
   an image processing unit comprising:
   a distortion coefficient extracting unit for extracting a distortion coefficient of a distortion caused in the image by the wide-angle lens, and
   a distortion correcting unit for correcting the distortion of the image using the extracted distortion coefficient to produce a corrected image;
   wherein the image processing unit further comprises a curve fitting unit for fitting a curve at outer portions of the corrected image in order to reduce blurring;
   wherein the curve fitting unit selects a plurality of points based on an inflection point in an $R_C$-$R_D$ graph and fits the curve at the outer portions using a cubic equation;
   wherein $R_C$ is a distance from a predetermined point to an origin of a coordinate system of the corrected image, and $R_D$ is a distance from a predetermined point to the origin of a coordinate system of the image with the distortion, and
   a display unit displaying the corrected image.

10. The apparatus of claim 9, wherein the wide-angle lens comprises a fish-eye lens having a viewing angle of less than 120°.

11. The apparatus of claim 9, wherein the distortion coefficient extracting unit obtains the distortion coefficient within a predefined range using a lens distortion model.

12. The method of claim 11, wherein the lens distortion model is given as follows:
   $R_C$, a distance from a predetermined point to an origin of a coordinate system of the corrected image, is equal to $R_D$, a distance from a predetermined point to an origin of a coordinate system of the image with the distortion, plus the cube of $R_D$;
   wherein a coefficient of the cube of $R_D$ is a distortion coefficient k, and the distortion coefficient k is greater than 0 and is equal to or less than (a−1) divided by $R_{DM}$, and
   wherein $R_{DM}$ is a maximum distance from the origin of the coordinate system of the image with the distortion to an outermost point of the image with the distortion, and a is a constant greater than 2.

13. The apparatus of claim 12, wherein the distortion correcting unit corrects a radial distortion caused by the wide-angle lens through backward mapping using the distortion coefficient.

14. The apparatus of claim 13, wherein the distortion correcting unit removes jagged-edge artifacts using a bilinear interpolation.

* * * * *